J. ADT.
MEAT-CUTTER.

No. 173,201.  Patented Feb. 8, 1876.

Witnesses.  
J. W. Shumway  
Clara Broughton

John Adt, Inventor  
By Atty. John E. Earle

UNITED STATES PATENT OFFICE.

JOHN ADT, OF NEW HAVEN, ASSIGNOR TO BENJAMIN E. FOWLER, OF HARTFORD, CONNECTICUT.

IMPROVEMENT IN MEAT-CUTTERS.

Specification forming part of Letters Patent No. 173,201, dated February 8, 1876; application filed October 26, 1875.

*To all whom it may concern:*

Be it known that I, JOHN ADT, of New Haven, in the county of New Haven and State of Connecticut, have invented a new Improvement in Meat-Cutters; and I do hereby declare the following, when taken in connection with the accompanying drawings and the letters of reference marked thereon, to be a full, clear, and exact description of the same, and which said drawings constitute part of this specification, and represent, in—

Figure 1:
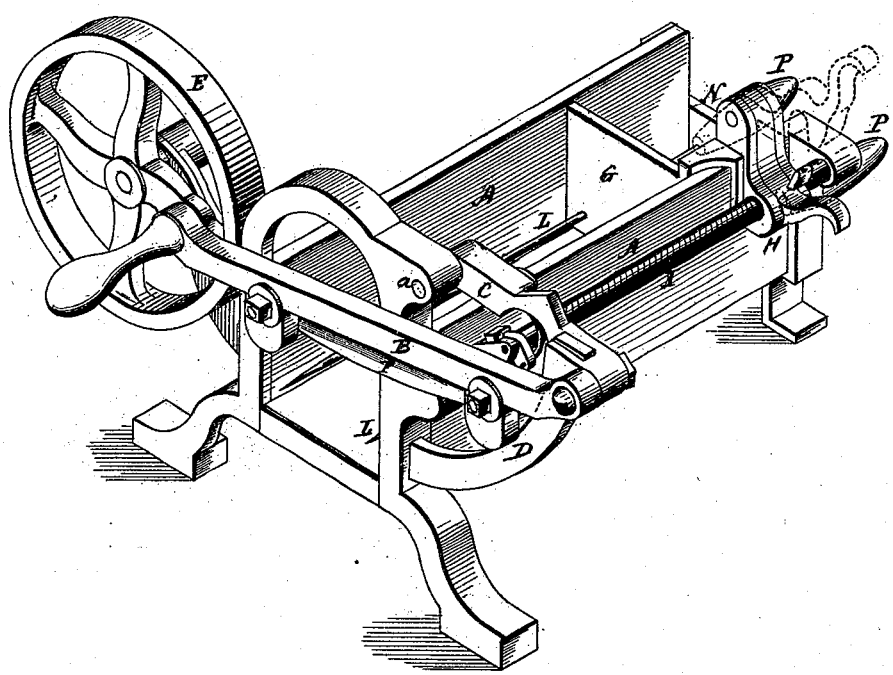
Figure 2:
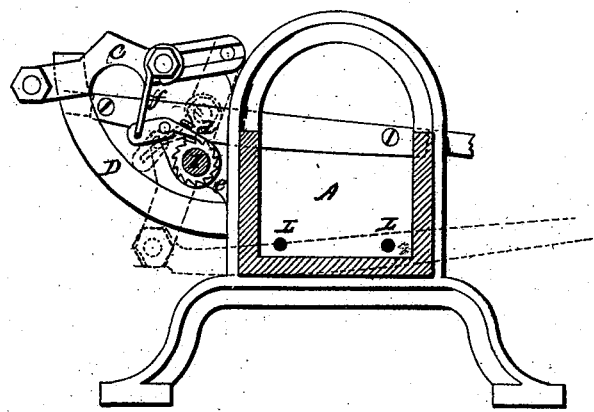

Figure 1, perspective view; Fig. 2, transverse section looking toward the front.

This invention relates to an improvement in apparatus for slicing meat and other material, designed with special reference to slicing dried beef; and it consists in the combination of mechanism, as hereinafter specified, and recited in the claim.

A is the hopper or case, within which the meat to be sliced is arranged, and with a stationary or immovable bottom. B is a cutter-bar, hung by a link, C, to a bearing, a, on the frame or hopper; this link is guided by a segment, D. The other end of the cutter-bar is attached to a crank-wheel, E, and so that by turning the said crank the cutter will be drawn downward across the opening of the hopper, one end governed by the crank in a circular path, the other in a segmental path by the link C, as indicated in broken lines, Fig. 2. On the cutter-bar a cutter, F, is arranged to slice the meat in its passage down across the mouth of the hopper and below its bottom. Within the hopper a follower, G, is arranged, so as to move freely toward and from the mouth of the hopper. This follower has a nut, H, attached to it, within which a leading-screw, I, works, and this screw is intermittently rotated by means of a pawl, d, working into a ratchet, e, as seen in Fig. 2, the ratchet worked by a connection, f, with the link C, so that at each ascent of the link C the screw will be given a partial rotation, which will cause the follower G to advance to that extent toward the mouth of the hopper.

The meat is placed in the hopper forward of the follower, and is fed by the movement of the follower to the cutter, and so that each downward movement of the cutter a slice will be taken from the meat.

To release the follower, so that it may be quickly adjusted in different positions, the nut H is made to open, as indicated in broken lines, and in the usual manner for such nuts.

In cutting meat in this manner it is difficult to hold it in the hopper in a proper position. To overcome this difficulty two pointed rods, L L, are passed through a cross-bar, N, on the rear of the hopper, and so as to lie longitudinally near the bottom, as seen in Fig. 2. These are each provided with a handle, P, and pass through corresponding perforations in the follower. These rods extend to or near the mouth of the hopper.

These rods are withdrawn, and, after the meat is properly laid in the hopper, so as to bear solidly upon the bottom, are passed through the meat and hold it firmly in that position. The follower, moving freely over the rods, presses the meat gradually off from the rods until it is completely cut.

More of these rods may be employed, if necessary, or in some cases one only will serve the purpose.

I am aware of Patent No. 161,510, and claim nothing therein contained as my invention.

I claim—

The combination of a hopper to receive the meat, a reciprocating knife to work across the mouth of the hopper, a suitable feed to move the meat in the hopper, and the rods L, more or less in number, substantially as and for the purpose specified.

JOHN ADT.

Witnesses:
JOHN E. EARLE,
CLARA BROUGHTON.